United States Patent [19]

Asano

[11] Patent Number: 4,738,341

[45] Date of Patent: Apr. 19, 1988

[54] LOCK SYSTEM FOR A SUITCASE OR CONTAINER

[75] Inventor: Tsutomu Asano, Tokyo, Japan

[73] Assignee: Marumi Co., Ltd., Tokyo, Japan

[21] Appl. No.: 925,173

[22] Filed: Oct. 31, 1986

[30] Foreign Application Priority Data

Aug. 20, 1986 [JP] Japan .................. 61-192886

[51] Int. Cl.⁴ .................. A45C 13/18; A45C 13/20
[52] U.S. Cl. .................. 190/101; 190/102
[58] Field of Search .................. 190/101, 102, 120; 150/52 R

[56] References Cited

U.S. PATENT DOCUMENTS

| | | | |
|---|---|---|---|
| 257,003 | 4/1882 | Harris | 190/101 |
| 338,846 | 3/1886 | Kimber | 190/101 |
| 359,219 | 3/1887 | Lyon | 190/101 |
| 672,173 | 4/1901 | Fevre | 190/102 |
| 1,532,710 | 4/1925 | Nellegar, Jr. | 190/101 |
| 1,567,461 | 12/1925 | Patterson | 190/101 |
| 1,586,113 | 5/1926 | Pedersen | 190/101 |
| 1,643,189 | 9/1927 | Urovsky | 190/101 |
| 3,909,031 | 9/1975 | Schmaedeke et al. | 150/52 R X |
| 3,960,300 | 6/1976 | Dickler | 150/52 R |
| 3,982,613 | 9/1976 | Wood | 190/18 A X |
| 4,460,092 | 7/1984 | Lee | 190/101 X |
| 4,488,624 | 12/1984 | Myers | 190/120 |

FOREIGN PATENT DOCUMENTS

| | | | |
|---|---|---|---|
| 702085 | 1/1941 | Fed. Rep. of Germany | 190/101 |
| 641937 | 5/1928 | France | 190/101 |
| 399017 | 9/1933 | United Kingdom | 190/101 |

*Primary Examiner*—William Price
*Attorney, Agent, or Firm*—Birch, Stewart, Kolasch, & Birch

[57] ABSTRACT

The present invention relates to a container for personal belongings like a traveler's bag, a suitcase and a brief case.

The container of the present invention includes a housing which is capable of housing a lengthy restrainer such as a wire. The housing is attached to a corner part or the peripheral part of the container main body, and one end of the lengthy restrainer is firmly fixed to the housing.

9 Claims, 10 Drawing Sheets

LOCK SYSTEM FOR A SUITCASE OR CONTAINER

BACKGROUND OF THE INVENTION

Field of the Invention

The present invention relates to a container for personal belongings like a traveler's bag, a suitcase and a brief case.

Description of the Prior Art

When taking a rest at a lobby in a hotel or airport, if one is not attentive to his baggage, he may be robbed of his bag. To prevent this, one may think of putting a chain having a padlock at its one end through the handle of the bag and wrapping it around a pillar or something nearby and locking the padlock. However, using a chain is troublesome to carry and may possibly get lost.

SUMMARY OF THE INVENTION

An objective of the present invention is to offer a container for personal belongings which effectively prevents robbery and moreover dispenses with the need of always carrying such a chain.

The container of the present invention is characterized in that a housing which is capable of housing a lengthy restrainer is attached to the main body of the container and one end of the lengthy restrain is firmly fixed to the housing.

With this container, robbery can be prevented by taking the lengthy restrainer out of the housing and putting it around a pillar or something nearby, while it dispenses with the trouble of always carrying chain, as the lengthy restrainer can be housed in the housing whenever the lengthy restrainer is not needed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

The container of the present invention is described according to FIGS. 1 through 4. The container main body 10 is equipped with a handle 12 and feet 14. A housing 20 is attached to the main body 10 at one corner by means of screws. A slit 22 is provided on the housing 20. A shaft 32 is rotatably held by the housing 20, one end of a flat spiral spring 34 is attached to the shaft 32, and the other end of the flat spiral spring 34 is attached to the housing 20. A reel 36 is fixed to the shaft 32 and a cylinder 38 is provided on the peripheral part of the reel 36. A pin 41 is attached to the housing 20, a lever 42 is held pivotally by the pin 41, and a one-way clutch 43 is attached to one end of the lever 42. This one-way clutch 43 is allowed to rotate clockwise in FIG. 3 but not counterclockwise in FIG. 3. A roller 44 is attached to the one-way clutch 43, a pressing spring 45 is installed between the housing 20 and the lever 42, and the roller 44 is pressed against the cylinder 38 by the force of the pressing spring 45. A push button 46 is provided through the housing 20 movable up and down, a pulling spring 47 is provided between the push button 46 and the housing 20, and the flat spiral spring 34 and the reel 36 compose a drawing means that draws a wire 50 into the housing 20. One end of the wire 50 is firmly fixed to the reel 36, a wire 50 is wound around the reel 36, and the other end of the wire 50 passes all the way through the slit 22. A lock main body 52 is attached to the other end of the wire 50, a rod 54 is fixed on the housing 20, and the lock main body 52 and the rod 54 comprise a lock system that can be unlocked when the right combination of numbers are attained by rotating a plural number of rings.

Figure 1:
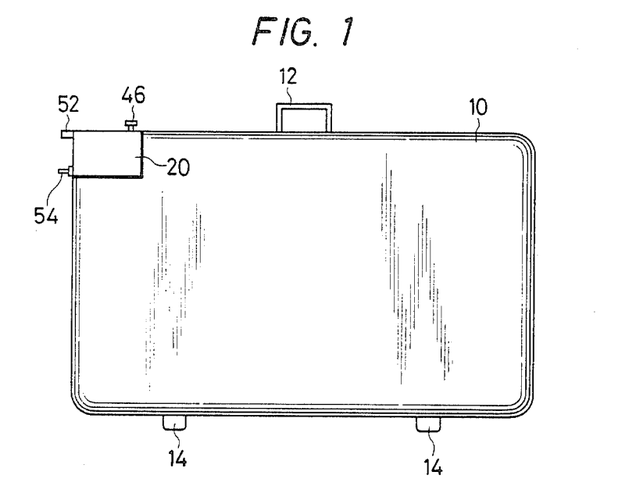
FIG. 1 is a front view of the container of the present invention.
Figure 2:
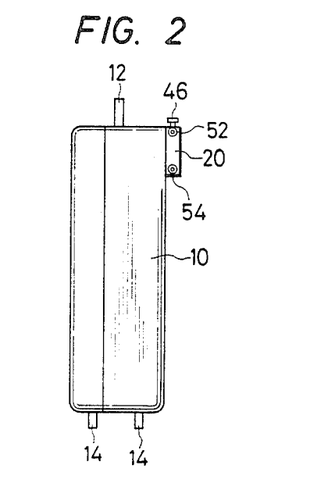
FIG. 2 is a side view of the container shown in FIG. 1.
Figure 3:
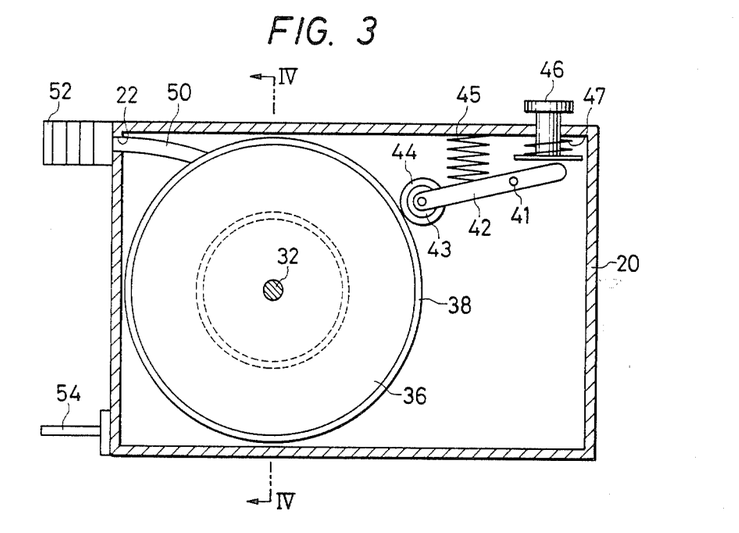
FIG. 3 is the sectional view showing a part of the container shown in FIGS. 1 and 2.
Figure 4:
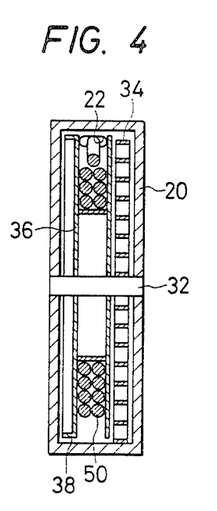
FIG. 4 is a sectional view along IV—IV of FIG. 3.
Figure 5:
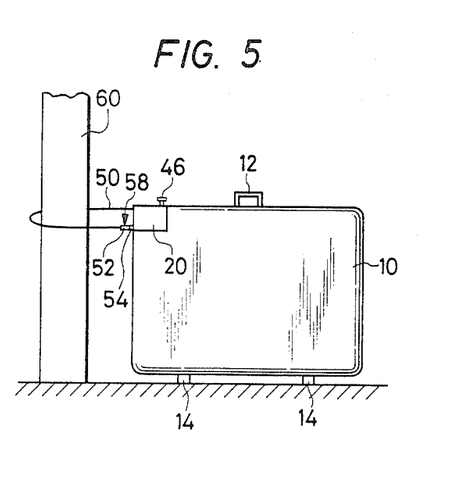
FIGS. 5 through 7 illustrate how the container shown in FIGS. 1 through 4 is used.
Figure 6:
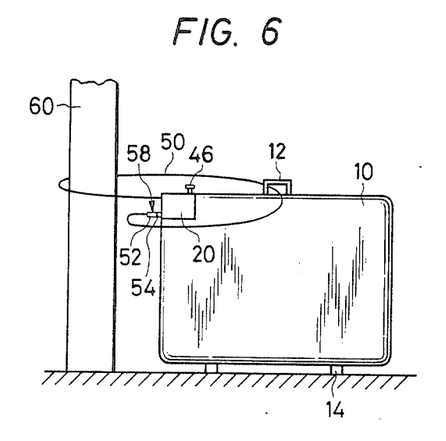
Figure 7:
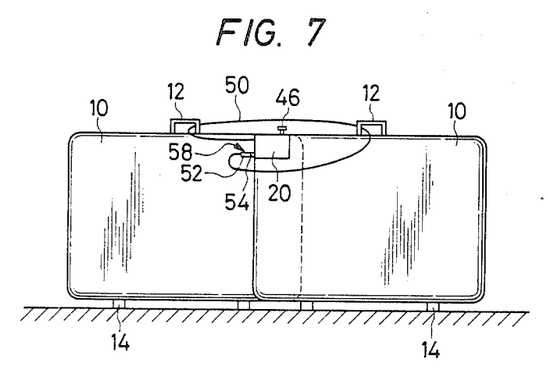

In this container, when the wire 50 is pulled out by holding the lock main body 52, the reel 36 rotates counter-clockwise in FIG. 3 resisting the force of the flat spiral spring 34. In doing so, the roller 44 and the one-way clutch 43 rotate clockwise in FIG. 3. When the pulling-out movement of the wire 50 is stopped, the roller 44 is pressed against the cylinder 38 by the force of the pressing spring 45 and the one-way clutch 43 cannot rotate counterclockwise, so that the reel 36 is not allowed to rotate and the wire 50 may not be wound back. At this state, if the lock system 58 is locked, after putting the wire 50 around a pillar 60 as shown in Fig. 5, or after putting the wire 50 through the handle 12 and around the pillar 60 as shown in FIG. 6, or after putting the wire 50 through the handle 12 of the container having the housing 20 and the handle 12 of another container as shown in FIG. 7, robbery can be prevented. Next, if the press button 46 is pressed down against the foce of the pulling spring 47 after unlocking the lock system 58, the lower end of the press button 46 pushes down the other end of the lever 42 and in turn the lever 42 pivots clockwise in FIG. 3 is resistance to the force of the pressing spring 45, so that the roller 44 is released from the cylinder 38 and the shaft 32 and the reel 36 rotate clockwise in FIG. 3 by the force of the flat spiral spring 34. By this rotating movement, the wire 50 is wound around the reel 36 and pulled into the housing 20, whereby the wire 50 is put back into the housing 20 as shown in FIG. 3.

Figure 8:
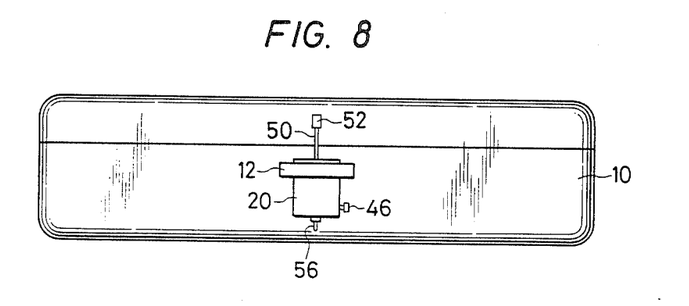
FIG. 8 is a side view of another container of the present invention.

Another container under the present invention is described in connection with FIG. 8. In this container, the housing 20 is fixed to the container main body 10 in the vicinity of the handle 12, a rod 56 is fixed on the housing 20 at the opposite side of where the wire 50 is to be pulled out, and the lock main body 52 and the rod 56 form the lock system that can be unlocked when the right combination of numbers is attained by rotating a plural number of rings. Also, the length of the wire 50 is almost equal to the circumferential length of the container main body 10.

Figure 9:
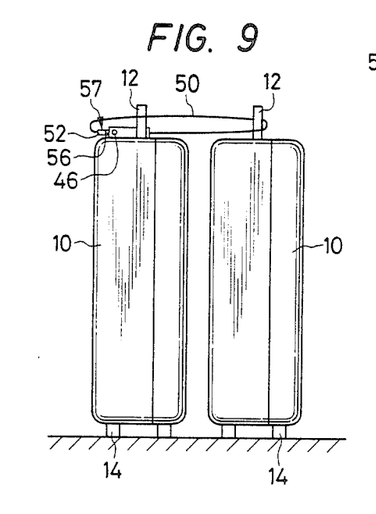
FIGS. 9 and 10 illustrate how the container shown in FIG. 8 is used.
Figure 10:
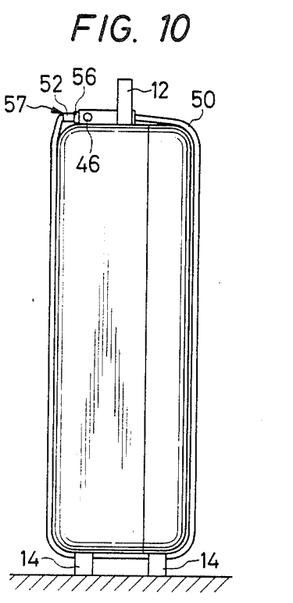

In this container, because of the housing 20 being mounted close to the handle 12, passing the wire 50 through the handle 12 of the container to which the housing 20 is provided and through the handle 12 of another container can be performed with ease as shown in FIG. 9. Also, because the length of the wire 50 is almost the same as the circumferential length of the container and moreover because the rod 56 is attached to the housing 20 on the side opposite to where the wire 50 is pulled out, the wire 50 can be used as a tightening belt by putting the wire 50 around the main body 10 of the container and locking the lock system 57, as shown in FIG. 10. In this case, if the wire 50 is covered with a covering made of plastic resin or the like, the container can be prevented from being damaged.

Figure 11:
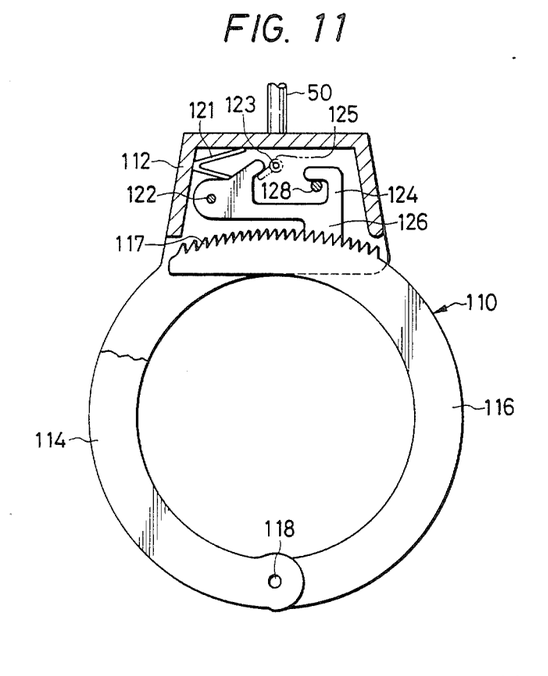
FIG. 11 is a partial sectional view of a lock system of another container of the present invention.

The lock system of another container under this invention is described according to FIG. 11. A housing 112 is fixed to the wire 50, an arm 114 and the housing 112 are made as one unit, a lever 116 is attached pivotally to the arm 114 by means of a pin 118, and teeth 117 are provided on the outside of one end of the lever 116. A pin 122 is mounted on the housing 112, a lever 124 is attached pivotally to the housing 112 by means of the pin 122, teeth 126 are provided at the end part of the lever 124, a stopper 128 which regulates the pivotal movement of the lever 124 is mounted on the housing 112, a flat spring 121 is provided between the housing 112 and the lever 124, the lever 124 is pressed by the force of the flat spring 121, the teeth 117 and the teeth 126 engage each other as shown in the drawing, and the lever 116 is allowed to pivot counterclockwise but not clockwise. Also, a projection 123 is fixed to the housing 112.

Figure 12:
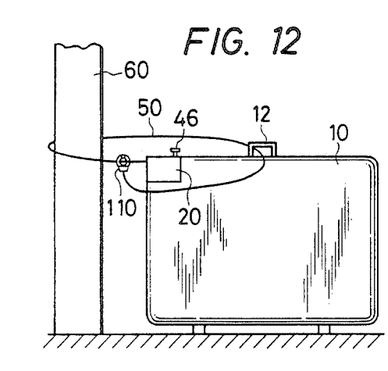
FIGS. 12 and 13 show how the container equipped with the lock system shown in FIG. 11 is used.
Figure 13:
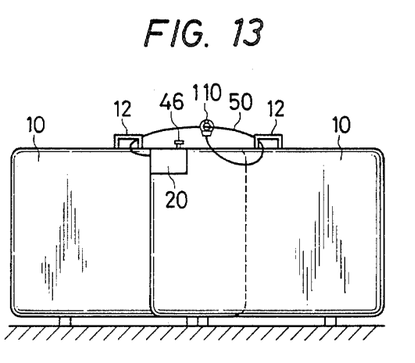

In a container equipped with this handcuff type lock system 110, if the lever 116 is pushed relative to the wire 50, such as knocking against it, after putting the wire 50 around the pillar 60 and through the handle 12 as shown in FIG. 12, or after putting the wire 50 through the handle 12 of the container on which the housing 20 is mounted and the handle 12 of another container as shown in FIG. 13, the lock system 110 becomes further locked due to the teeth 117 and the teeth 126 engaging with each other. The arm 114 and the lever 116 surround the wire 50 upon the lever 116 being rotated closed, and thus facilitates a very simple locking action. Further, when a key 125 is hooked to the projection 123 and the key 125 is rotated clockwise in FIG. 11, the lever 124 pivots counterclockwise resisting the force of the flat spring 121 thereby releasing the engagement of the teeth 117 and the teeth 126, so that the lever 116 is allowed to pivot clockwise and the lock system 110 can be unlocked.

Figure 14:
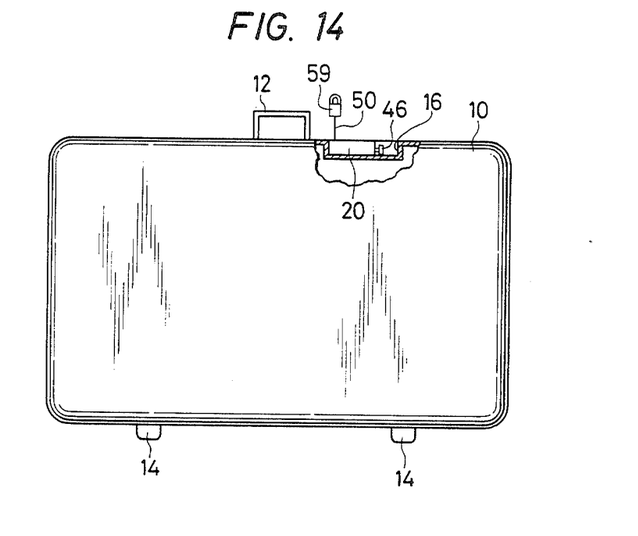
FIG. 14 is a partial sectional front view of another container of the present invention.

Another container of the present invention is described with reference to FIG. 14. A hollow part 16 in which the housing 20 is installed is provided on the upper part of the container main body 10 and the lock system 59 having a hook which can be unlocked when the right combination of numbers is attained by rotating a plural number of rings, is firmly attached to one end of the wire 50.

Figure 15:
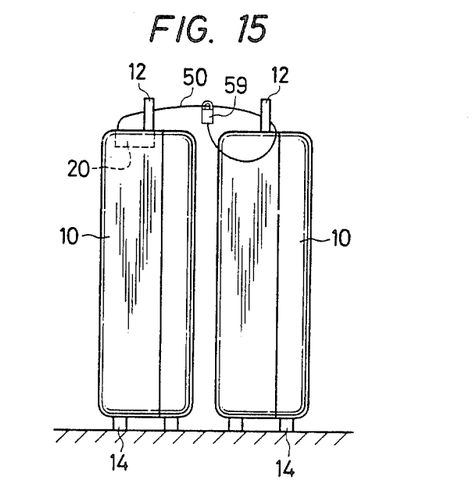
FIG. 15 is a drawing illustrating how the container shown in FIG. 14 is used.

In this container, for example as shown in FIG. 15, robbery can be prevented by putting the lock system 59 around the wire 50 and locking it, after passing the wire 50 through the handle 12 of the container to which the housing 20 is mounted and the handle 12 of another container. Further, the housing 20 does not create any obstacle as it is submerged in the container main body 10.

Figures 16, 17:
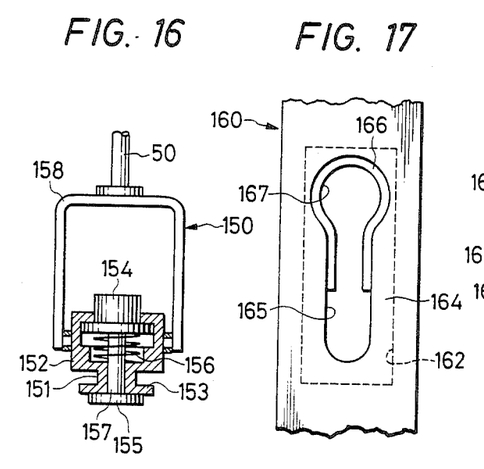
FIG. 16 is a sectional view of a simplified lock system of another container under the present invention.
FIG. 17 shows a catch device which is to engage with the simplified lock system shown in FIG. 16.

A simplified lock system for another container under the present invention is described referring to FIG. 16. A movable member 154 is held movably by a simplified lock system main body 152, and a spring 156 is provided between the simplified lock system main body 152 and the movable member 154. A small diameter part 151 and a flange 153 are provided on the simplified lock system main body 152, and a small diameter part 157 and a flange 155 are provided on the movable member 154, the diameter of flange 153 being larger than that of the flange 155. An arm 158 is mounted pivotally on the simplified lock system main body 152, and the arm 158 is firmly attached to the wire 50.

Referring to FIG. 17, a catch device to which the simplified lock system 150, as shown in FIG. 16, is to be hooked is described. A groove 162 is provided on the container main body 10, an upper plate 164 covers the groove 162, a slit 165, having a circular part which permits the flange 153 to pass through and a straight part which allows the small diameter part 151 to move along, is provided on the upper plate 164. A lower plate is provided within the groove 162, and a grovoe 167, having a circular part with a diameter that permits the flange 155 to pass through and a straight part that permits the small diameter part 157 to move along, is provided on the lower plate 166.

Figure 18:
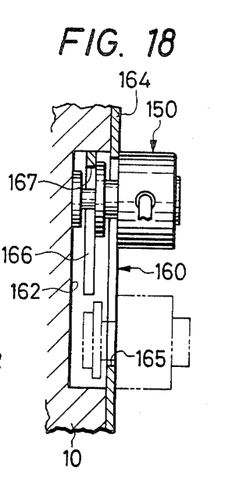
FIG. 18 shows a state wherein the simplified lock system shown in FIG. 16 is engaged with the catch device shown in FIG. 17.

With reference to FIG. 18, described here is the hooking action of the simplified lock system 150 to the catch device 160 as shown in FIG. 17. First, insert the flange 153 and 155 into the groove 162 and move the simplified lock system 150 down toward the bottom of the drawing while keeping the movable member 154 in a pressed state in resistance to the force of the spring 156, into the position shown by the two-dot lines. Under this state, even if one tries to move the simplified lock system 150 upward toward the top of the drawing, no such movement is possible, as the flange 155 hits the lower plate 166. If the simplified lock system 150, however, is moved upward toward the top of the drawing while keeping the movable member 154 pressed in against the resistance to the force of the spring 156, the simplified lock system can be moved up to the position indicated by a solid line and the simplified lock system 150 can be released from the catch device 160.

Figure 19:
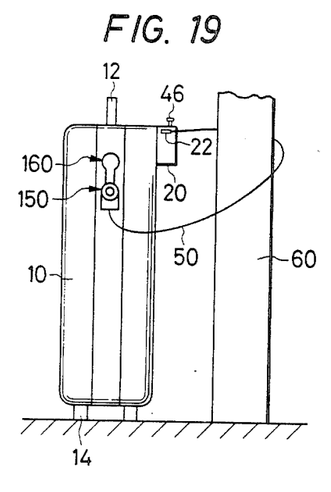
FIGS. 19 and 20 show how the container equipped with the simplified lock system shown in FIG. 16 is used.
Figure 20:
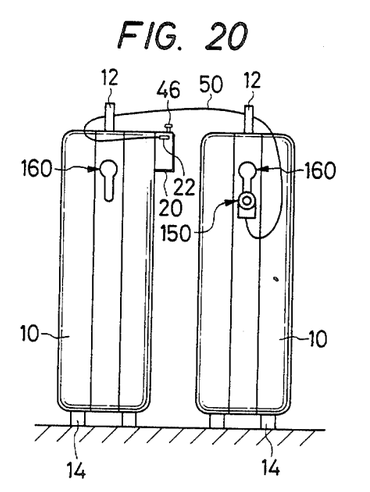

In the container having these simplified lock system 150 and catch device 160 installed, robbery can be prevented if the simplified lock system 150 is hooked to the catch device 160 after putting the wire 50 around the pillar 60 as shown in FIG. 19, or if the simplified lock system 150 is hooked to the catch device 160 mounted on another container after putting the wire 50 through the handle 12 of the container having the housing 20 and the handle 12 of another container as shown in FIG. 20, and thus facilitates easier simplified locking and unlocking.

Figure 21:
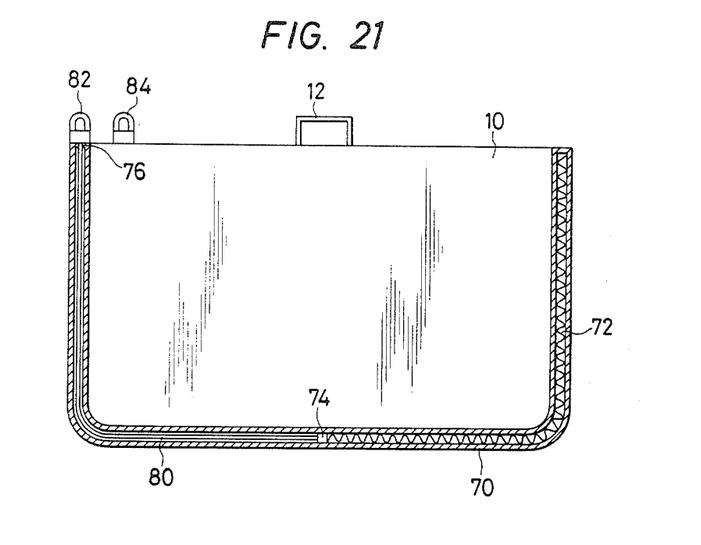
FIG. 21 shows a partial sectional front view of another container of the present invention.
Figure 22:
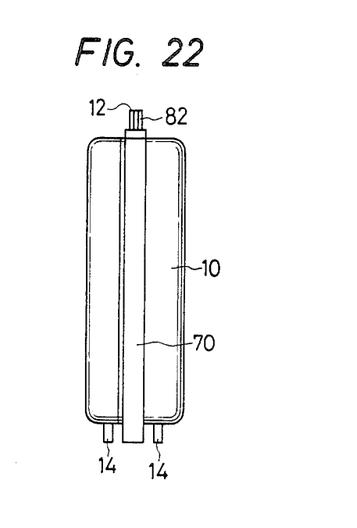
FIG. 22 is a side view of the container shown in FIG. 21.

Another container under the present invention is described according to FIGS. 21 and 22. A housing 70 is attached by screws to the peripheral part of the container main body 10, a spring 72 is housed in the housing 70, and one end of the spring 72 is firmly fixed to the housing 70. A stopper 74 is attached to the other end of the spring 72, a hole 76 is provided on the housing 70, and the spring 72 consists of a drawing means which pulls in a wire 80 into the housing 70. One end of the wire 80 is attached to the stopper 74 and the other end of the wire 80 passes all the way through the hole 76. A loop 82 is attached to the other end of the wire 80 and a loop 84 is fixed to the container main body 10.

In this container, robbery can be prevented by passing the arm of a padlock (not shown) through two loops 82 and 84 and locking the padlock, after pulling out the wire 80 in resistance of the force of the spring 72 and putting the wire 80 around the pillar. Then if one releases the wire 80 after unlocking the padlock, the wire 80 is pulled back into the housing 70 by means of spring 72 and the wire 80 is housed in the housing 70.

Figure 23:
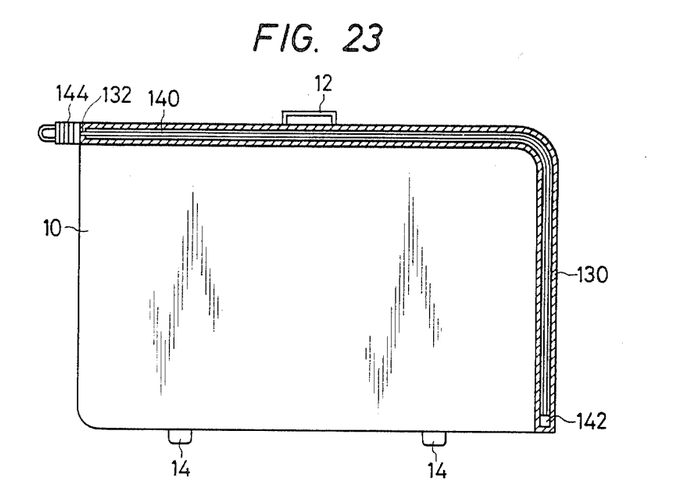
FIG. 23 shows a partial sectional front view of another container of the present invention.

Referring to FIG. 23, another container of this invention is described. A housing 130 is mounted on the peripheral part of the container main body 10 by means of screws, a hole 132 is provided on the housing 130, a wire 140 is housed in the housing 130, a stopper 142 is fixed on one end of the wire 140, the other end of the wire 140 passes all the way through the hole 132, and a lock system 144, which is provided with a hook and which can be unlocked by selecting the right combination of numbers by rotating a plural number of rings, is attached to the other end of the wire 140.

Figure 24:
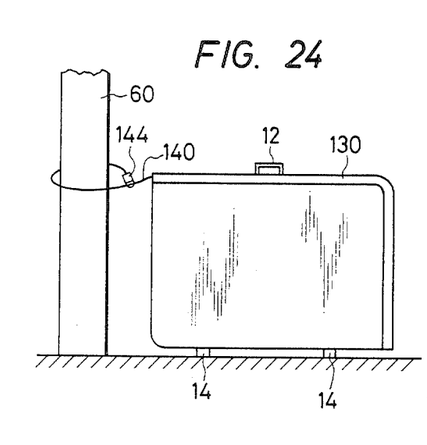
FIG. 24 shows how the container shown in FIG. 23 is used.

As shown in FIG. 24, in this container, the prevention of robbery can be attained by locking the lock system 144 to the wire 140, after pulling out the wire 140 from the housing 130 and putting it around the pillar 60. Also, by unlocking the lock system 144 and pushing back the wire 140 into the housing 130, the wire 140 can be housed in the housing 130.

Figure 25:
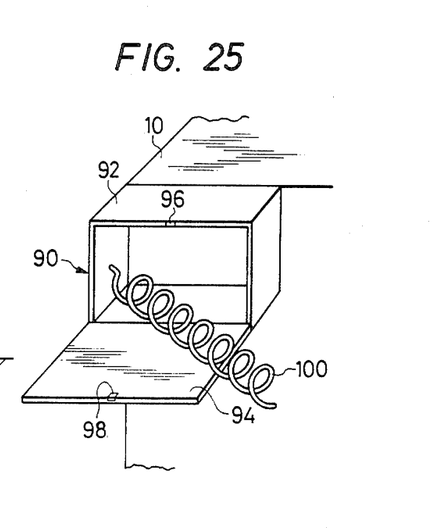
FIG. 25 is an oblique view showing a part of another container of the present invention.

FIG. 25 is an oblique view of another container under the present invention. A housing 90 consists of a housing main body 92 and a lid 94, the housing main body 92 is screwed to a corner part of the container main body 10, and the lid 94 is attached to the housing main body 92 pivotably. A magnet 96 is mounted on the housing main body 92, a magnet 98 is mounted on the lid 94, the magnet 98 is mounted at the position that matches the position of the magnet 96. A wire 100 in a coil shape is firmly attached to the inside of the housing main body 92.

In this container, robbery can be prevented by putting the arm of a padlock (not shown) through a loop (not shown) provided at one end of the wire 100 and loop (not shown) provided on the container main body 10 after pulling out the wire 100 upon lifting the lid 94 and placing the wire 100 around the pillar, and locking the padlock. Then, after unlocking the padlock and putting back the wire 100 into the housing main body 92, the lid 94 is closed and the lid 94 is kept in a closed state by the magnets 96 and 98, whereby the wire 100 is housed in the housing main body.

Figure 26:
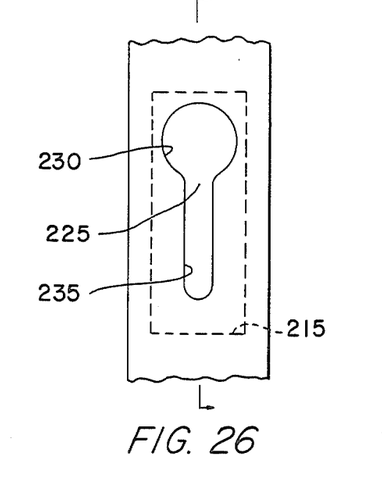
FIG. 26 shows another catch device.
Figure 27:
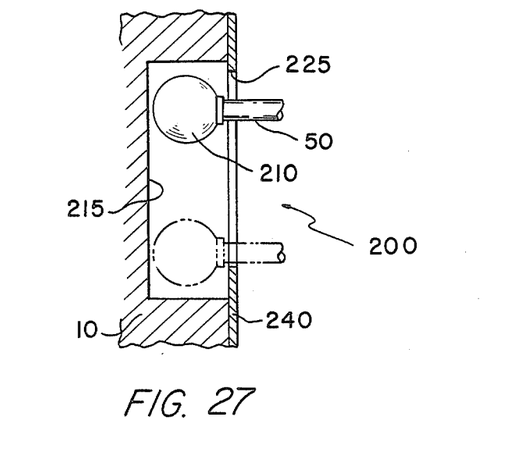
FIG. 27 shows a sectional view of another simplified lock system for engaging with the catch device shown in FIG. 26.

Further, in all the above-mentioned containers, the housings 20, 70, 90 and 130 are attached to the container main body 10 by means of screws, but these housings 20, 70, 90 and 130 can be designed to be detachable from the container main body 10 by one action, thus allowing the housings 20, 70, 90 and 130 to be easily replaced in case of any malfunctioning. In this case, the wires 50, 80, 100 and 140 are to be put through the handle 12 of the container to which the the housings 20, 70, 90 and 130 are mounted, as shown in FIGS. 6 and 7. In the above-mentioned containers, although the wires 50, 80, 100 and 140 are employed as the lengthy restrainer, a chain or a long thin plate may be used as the lengthy restrainer, and moreover as the material of the lengthy restrainer synthetic rubber, vinyl resin or flexible ceramics may be used as well. Further, in the abovementioned containers, a flat spiral spring 34 and reel 36 are employed or a spring 72 is employed as the drawing means though, other drawing means, for example rubber, may also be used. Further, in the above-mentioned containers, the housings 20 and 90 are mounted at one corner of the container main body 10, but the housings 20 and 90 may well be attached to other parts of the container main body 10. In addition, in the containers cited above, whereas the housings 70 and 130 are mounted on a peripheral part of the container main body 10, the housings 70 and 130 may be mounted on other parts of the container main body 10. Furthermore, in the container shown in FIG. 25, although a wire 100 of a coil shape is used, a linear shaped wire may be used, and in this case the wire is to be folded up and housed in the housing 90. Further, in the afore-mentioned containers, the locking systems 57, 58, 59, 110 and 144 are employed, but other kinds of lock system may be employed. Also, in the container cited in the above, the simplified lock system 150 is employed, but another simplified lock system 200 may be utilized as illustrated in FIGS. 26 and 27. This lock system comprises a sphere 210 which may be attached to one end of the wire 50 as a simplified lock system, and, in this case, a groove 215 is to be provided on the container main body 10 with a covering plate 220 to cover it, and a slit 225 having a circular opening 230 with a diameter larger than the diameter of the sphere 210 and a V-shaped linear cut-in 235 which is narrower than the diameter of the sphere but wider than the diameter of the wire 50 are to be provided on covering plate 240 to form another catch device. Furthermore, in the container shown in FIG. 14, the housing 20 is submerged in the container main body 10 and in a similar manner, the housings 70, 90 and 130 may also be submerged in the container main body 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A container for personal belongings, said container comprising:
   a container main body;
   a housing attached to said container main body;
   a lengthy restrainer firmly fixed to said housing, said housing being capable of housing said lengthy restrainer; and
   drawing means for drawing in said lengthy restrainer into said housing, said drawing means comprises:
   a reel rotatably mounted within said housing;
   a flat spiral spring for rotating said reel, one end of said lengthy restrainer being firmly attached to said reel;
   a cylinder is provided on a peripheral part of said reel;
   a lever pivotably mounted by said housing,
   a one-way clutch attached to one end of said lever;
   a roller attached to said one-way clutch;
   a pressing spring provided between said housing and said lever, said roller being pressed against said cylinder by said pressing spring;
   a press button movably mounted by said housing; and
   a pulling spring provided between said press button and said housing, whereby when said press button is pressed into said housing against a biasing force of said pulling spring, said button presses the other end of said lever.

2. The container according to claim 1, wherein said housing is attached to a corner part of said container main body.

3. The container according to claim 1, wherein said housing is attached at the vicinity of a handle to said container main body, and a length of said lengthy restrainer is almost equal to the circumferential length of said container main body.

4. The container according to claim 1, wherein said housing is attached to said container main body so as to be detachable by one action.

5. The container according to claim 1, wherein said housing is attached to said container main body in a submerged position.

6. The container according to claim 1, wherein a lock system is firmly attached to said lengthy restrainer.

7. The container according to claim 6, wherein said lock system is a handcuff type lock system.

8. The container according to claim 1, wherein a simplified lock system is firmly attached to said lengthy restrainer.

9. The container according to claim 1, wherein a hook is firmly attached to said lengthy restrainer.

* * * * *